US011447389B2

United States Patent
Mortensen et al.

(10) Patent No.: US 11,447,389 B2
(45) Date of Patent: Sep. 20, 2022

(54) SYSTEM AND PROCESS FOR PRODUCTION OF SYNTHESIS GAS

(71) Applicant: HALDOR TOPSØE A/S, Kgs. Lyngby (DK)

(72) Inventors: Peter Mølgaard Mortensen, Roskilde (DK); Kim Aasberg-Petersen, Allerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 371 days.

(21) Appl. No.: 16/753,501

(22) PCT Filed: Nov. 15, 2018

(86) PCT No.: PCT/EP2018/081410
§ 371 (c)(1),
(2) Date: Apr. 3, 2020

(87) PCT Pub. No.: WO2019/110269
PCT Pub. Date: Jun. 13, 2019

(65) Prior Publication Data
US 2020/0290868 A1  Sep. 17, 2020

(30) Foreign Application Priority Data

Dec. 8, 2017 (DK) .......................... PA 2017 00701

(51) Int. Cl.
   *C01B 3/38*    (2006.01)
   *B01J 19/00*   (2006.01)
   *B01J 19/24*   (2006.01)
(52) U.S. Cl.
   CPC ........... *C01B 3/382* (2013.01); *B01J 19/0013* (2013.01); *B01J 19/245* (2013.01);
   (Continued)

(58) Field of Classification Search
   CPC ............ C01B 3/382; C01B 2203/0233; C01B 2203/0244; C01B 2203/0866;
   (Continued)

(56) References Cited

U.S. PATENT DOCUMENTS 6,527,980 B1    3/2003  Roden et al.
9,101,899 B2 *  8/2015  Singh ..................... B01J 8/0484
                        (Continued)

FOREIGN PATENT DOCUMENTS

EP    0033128 A1    8/1981
EP    0334540 A2    9/1989
            (Continued)

OTHER PUBLICATIONS

International Search Report and Written Opinion issued in corresponding International Patent Application No. PCT/EP2018/EP2018/081410, 14 pages (dated Jan. 3, 2019).
(Continued)

*Primary Examiner* — Matthew J Merkling
(74) *Attorney, Agent, or Firm* — Buchanan Ingersoll & Rooney P.C.

(57) ABSTRACT

A system for production of a synthesis gas, including: a synthesis gas generation reactor arranged for producing a first synthesis gas from a hydrocarbon feed stream; a post converter including a catalyst active for catalyzing steam methane reforming, methanation and reverse water gas shift reactions; the post converter including a conduit for supplying a $CO_2$ rich gas stream into a mixing zone of the post converter, where the $CO_2$ rich gas stream in the conduit upstream the mixing zone is in heat exchange relationship with gas flowing over the catalyst downstream the mixing zone; a pipe combining the at least part of the first synthesis gas and the $CO_2$ rich gas stream to a mixed gas, in a mixing zone being upstream the catalyst; wherein the post converter
(Continued)

further includes an outlet for outletting a product synthesis gas from the post converter. Also, a corresponding process.

12 Claims, 1 Drawing Sheet

(52) U.S. Cl.
CPC ............ *B01J 2219/0004* (2013.01); *B01J 2219/00123* (2013.01); *C01B 2203/0233* (2013.01); *C01B 2203/0244* (2013.01); *C01B 2203/0866* (2013.01); *C01B 2203/1235* (2013.01); *C01B 2203/1282* (2013.01)

(58) Field of Classification Search
CPC ...... C01B 2203/1235; C01B 2203/1282; B01J 19/0013; B01J 19/245
See application file for complete search history.

(56) References Cited

U.S. PATENT DOCUMENTS

| | | | |
|---|---|---|---|
| 9,834,440 B2 | 12/2017 | Kern et al. | |
| 2003/0014974 A1 | 1/2003 | Rojey et al. | |
| 2004/0182002 A1* | 9/2004 | Malhotra | B01J 8/065 48/128 |
| 2009/0012188 A1 | 1/2009 | Rojey et al. | |
| 2010/0140553 A1* | 6/2010 | Wang | C10J 3/02 422/600 |
| 2012/0326090 A1* | 12/2012 | Han | B01J 8/067 252/372 |
| 2013/0345326 A1 | 12/2013 | Bashir et al. | |
| 2016/0318824 A1 | 11/2016 | Steynberg et al. | |
| 2020/0215511 A1* | 7/2020 | Wang | C01B 3/382 |

FOREIGN PATENT DOCUMENTS

| | | |
|---|---|---|
| EP | 0361648 A1 | 4/1990 |
| EP | 0504471 A1 | 9/1992 |
| EP | 0983963 A2 | 3/2000 |
| EP | 1106570 A2 | 6/2001 |
| WO | 03070629 A1 | 8/2003 |
| WO | 2014180888 A1 | 11/2014 |

OTHER PUBLICATIONS

Search Report issued in corresponding Danish Patent Application No. PA 2017 00701, 8 pages (dated Jun. 18, 2018).
Aasberg-Petersen, K., et al., "Synthesis gas production for FT synthesis," Studies in Surface Science and Catalysis vol. 152, Chapter 4, p. 258-405 (2004).
Mortensen, Peter M., et al., "Industrial scale experience on steam reforming of CO2-rich gas," Elsevier, Science Direct, Applied Catalysis A: General 495, pp. 141-151 (2015).

* cited by examiner

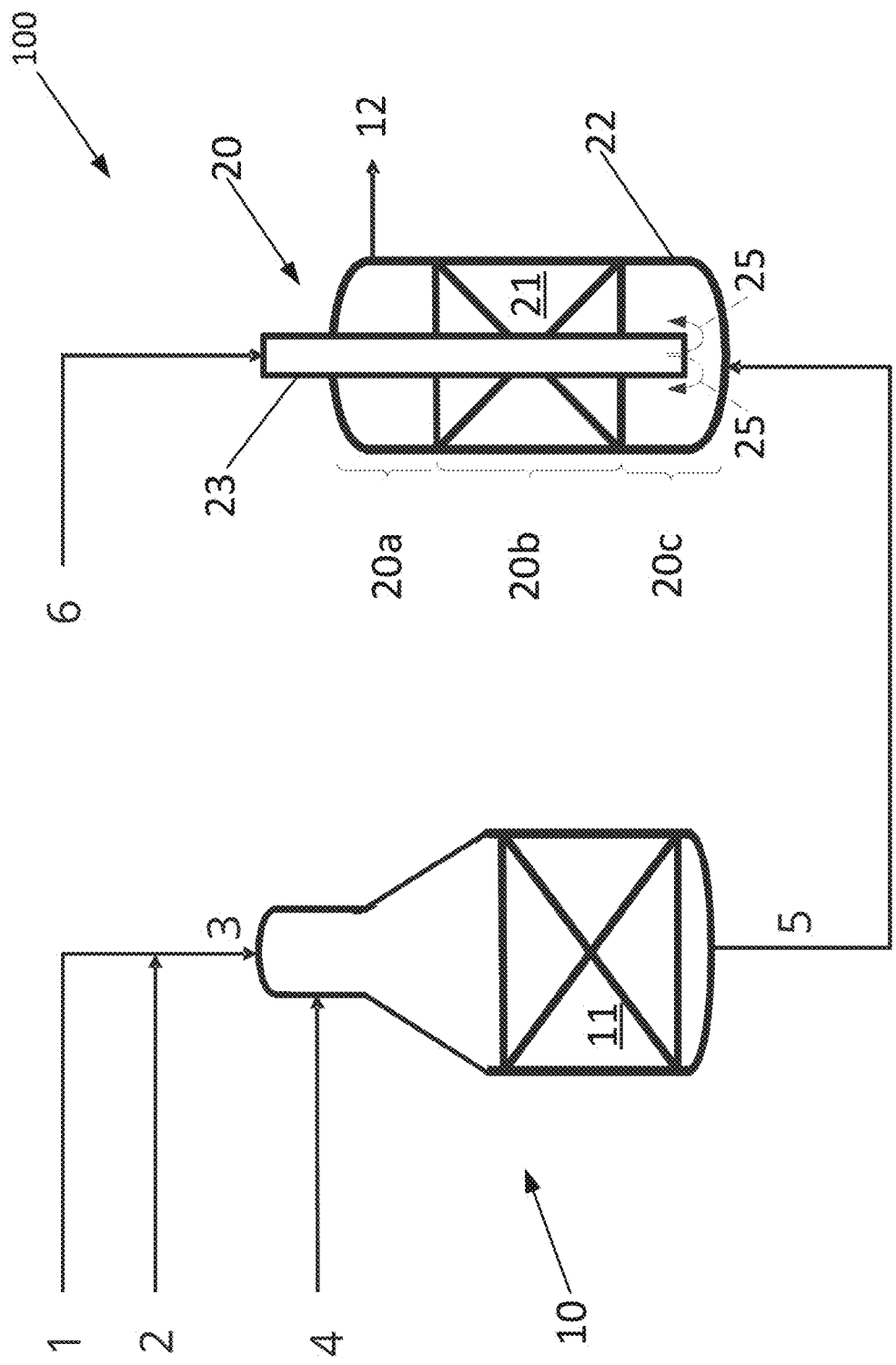

SYSTEM AND PROCESS FOR PRODUCTION OF SYNTHESIS GAS

FIELD OF THE INVENTION

The present invention relates to a system for the production of a synthesis gas. The invention also relates to a process for the production of a synthesis gas. More specifically, the invention relates to a system and a process aimed at producing a synthesis gas with a low $H_2/CO$ ratio.

BACKGROUND

Catalytic synthesis gas production by steam reforming of a hydrocarbon feed has been known for decades. The endothermic steam reforming reaction is typically carried out in a steam reformer (SMR). A steam reformer or steam methane reformer has a number of catalyst filled tubes placed in a furnace or fired heater to provide the heat for the endothermic reaction. The tubes are normally 10-14 meters in length and 7-15 cm in inner diameter. The heat for the endothermic reaction is supplied by combustion of fuels in burners in the furnace. The synthesis gas exit temperature from the steam reformer depends on the application of the synthesis gas but will normally be in the range from 650° C.-980° C.

It is known that carbon formation on the catalyst used in catalytic synthesis gas production by steam reforming is a challenge, especially for production of synthesis gasses with a relatively low $H_2/CO$ ratio. Therefore, catalysts resistant to carbon formation are required for such synthesis gasses. Such carbon resistant catalysts are e.g. noble metal catalysts, partly passivated nickel catalysts, and promoted nickel catalysts. Moreover, industrial scale reforming of $CO_2$ rich gas typically requires a co-feed of water to decrease the severity of the gas for carbon formation. From a thermodynamic viewpoint, it is advantageous to have a high concentration of $CO_2$ and a low concentration of steam in the feed to promote the production of synthesis gas with a low $H_2/CO$ ratio. However, operation at such conditions may not be feasible due to the possibility of carbon formation on the catalyst.

Alternative production of a synthesis gas with a low $H_2/CO$ ratio by steam reforming is a sulfur passivated reforming (SPARG) process which may be used for producing synthesis gas with a relatively low $H_2/CO$ ratio. This process requires desulfurization of the produced synthesis gas to produce a sulphur free synthesis gas.

More details of various processes for producing synthesis gas with low $H_2/CO$-ratio can be found in "Industrial scale experience on steam reforming of $CO_2$-rich gas", P. M. Mortensen & I. Dybkjr, Applied Catalysis A: General, 495 (2015), 141-151.

Processes based on Autothermal Reforming (ATR) are an alternative route to production of synthesis gas, especially when a low ratio of hydrogen to carbon monoxide is required. The main elements of an ATR reactor are a burner, a combustion chamber, and a catalyst bed contained within a refractory lined pressure shell. In an ATR reactor, partial combustion of the hydrocarbon feed stream by sub-stoichiometric amounts of oxygen is followed by steam reforming of the partially combusted feedstock in a fixed bed of steam reforming catalyst. Steam reforming also takes place to some extent in the combustion chamber due to the high temperature. The steam reforming reaction is accompanied by the water gas shift reaction. Typically, the gas is at or close to equilibrium at the outlet of the reactor with respect to steam reforming and water gas shift reactions. The temperature of the exit gas is typically in the range between 850° C. and 1100° C. More details of ATR and a full description can be found in the art, such as "Studies in Surface Science and Catalysis", Vol. 152, "Synthesis gas production for FT synthesis"; Chapter 4, p. 258-352, 2004.

An ATR reactor uses oxygen and steam, and optionally also carbon dioxide, in a reaction with a hydrocarbon feed stream to form synthesis gas. The ratio of hydrogen to carbon monoxide in the exit gas depends upon the selected operation conditions including the amount of steam and carbon dioxide added to the hydrocarbon feed stream and/or the ATR reactor. Increasing the amount of carbon dioxide will decrease the hydrogen to carbon monoxide ratio in the product synthesis gas, but will also increase the oxygen consumption as well as the size of the reactor due to the higher flow.

It is also known in the art that steam reforming may be carried out by heat exchange reforming. In heat exchange reforming, the hot product stream from either a steam reformer or an ATR reactor is used as a source of heat to drive the steam reforming reaction. For example, EP-0033128 and EP-0334540 deal with parallel arrangements, in which a hydrocarbon feed stream is introduced in parallel to a radiant furnace and heat exchange reformer. The partially reformed gas from the radiant furnace is then used as a heat source for the reforming reactions in the heat exchange reformer.

Other parallel arrangements combine heat exchange reforming and autothermal reforming. EP0983963, EP1106570 and EP0504471 deal with processes in which a hydrocarbon feed stream is introduced in parallel to a heat exchange reformer and an autothermal reforming reactor. The hot product synthesis gas from the autothermal reformer is used as a heat exchanging medium for the reforming reactions occurring in the heat exchange reformer.

A heat exchange reformer may also be placed upstream and in series with a steam reformer or an ATR reactor.

In most cases the product synthesis gas leaving the heat exchange reformer has a temperature of 500-750° C.

Heat exchange reforming has the potential to increase the overall plant efficiency and to save fuel and/or oxygen. However, a challenge in heat exchange reforming, especially for production of CO rich synthesis gas, is metal dusting when the hot product stream from a steam reformer or an ATR reactor is cooled to provide heat for the steam reforming reaction. Metal dusting is known in the art (see e.g. "Studies in Surface Science and Catalysis", Vol. 152, "Synthesis gas production for FT synthesis"; 2004, Chapter 4, section 2.3.4.3. p. 304-305) and is a type of corrosion that may occur when metals come into contact with CO containing gases at 400-800° C.

It is an object of the present invention to provide a system and a process for production of a synthesis gas with a lower $H_2/CO$ ratio than is normally possible in either an SMR or an ATR reactor while alleviating the risk of carbon formation on the catalyst used in an SMR and reducing the oxygen consumption and the reactor size when using an ATR reactor. It is also an object of the invention to provide a system and process useful as a revamp of an existing system and process (based either on an ATR reactor or an SMR) with increased capacity. It is furthermore an object of the invention to provide a system and a process with higher efficiency than either an SMR or an ATR reactor. It is furthermore an object of the invention to provide a CO rich synthesis gas, viz. a synthesis gas with a $H_2/CO$ ratio below 2.5, preferably below 2.0, and more preferably below 1.8 or even 1.6. The term "CO rich synthesis gas" is meant to by synonymous to the term "synthesis gas with a low $H_2/CO$ ratio". The term "synthesis gas" is meant to denote a gas comprising hydrogen, carbon monoxide and possibly also carbon dioxide and small amounts of other gasses, such as argon, nitrogen, etc.

The term "reforming" is meant to denote steam reforming according to one or more of the following reactions:

$$CH_4 + H_2O \leftrightarrow CO + 3H_2 \qquad (i)$$

$$CH_4 + 2H_2O \leftrightarrow CO_2 + 4H_2 \qquad (ii)$$

$$CH_4 + CO_2 \leftrightarrow 2CO + 2H_2 \qquad (iii)$$

Reactions (i) and (ii) are steam methane reforming reactions, whilst reaction (iii) is the dry methane reforming reaction.

For higher hydrocarbons, viz. $C_nH_m$, where $n \geq 2$, $m \geq 4$, equation (i) is generalized as:

$$C_nH_m + nH_2O \rightarrow nCO + (n + m/2)H_2 \qquad (iv), \text{ where } n \geq 2, m \geq 4$$

Typically, reforming is accompanied by the water gas shift reaction (v):

$$CO + H_2O \leftrightarrow CO_2 + H_2 \qquad (v)$$

The term "steam methane reforming" is meant to cover the reactions (i) and (ii) running from the left towards the right side of the arrow, whilst the term "methanation" is meant to cover the reverse reactions of reactions (i) and (ii) running from the right towards the left side of the arrow. Thus, the term "steam methane reforming and methanation reactions" is meant to denote the reactions (i) and (ii) running towards equilibrium. The term "reverse water gas shift" is meant to denote the reaction of reaction (v) running from the right towards the left side of the arrow. In most cases, all of these reactions are at or close to equilibrium at the outlet from the catalyst bed or catalyst zone of the reactor concerned.

SUMMARY OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One aspect of the invention relates to a system for production of a synthesis gas. The system comprises a synthesis gas generation reactor arranged for producing a first synthesis gas from a hydrocarbon feed stream, and a post converter comprising a shell housing a catalyst, where the catalyst is active for catalyzing steam methane reforming, methanation and reverse water gas shift reactions. The post converter comprises a conduit for supplying a $CO_2$ rich gas stream into the mixing zone of the post converter, where the mixing zone is upstream the catalyst of the post converter. The $CO_2$ rich gas stream in the conduit upstream the mixing zone is in heat exchange relationship with the product synthesis gas from the catalyst of the post converter, the gas flowing over the catalyst downstream the mixing zone, and/or the mixed gas. The system moreover comprises a pipe for supplying at least a part of the first synthesis gas from the synthesis gas generation reactor into the mixing zone of the post converter, thereby combining the at least part of the first synthesis gas and the $CO_2$ rich gas stream to a mixed gas, the mixing zone being upstream the catalyst, Finally, the post converter comprises an outlet for outletting a product synthesis gas from the post converter. Preferably, the conduit is totally or substantially housed or contained within post converter.

The first synthesis gas is mixed with the $CO_2$ rich gas stream within a mixing zone of the post converter, thereby providing a mixed gas, subsequent to the $CO_2$ rich gas stream being heated by heat exchange with the product synthesis gas from the catalyst of the post converter, the gas flowing over the catalyst, and/or the mixed gas. Subsequently, the mixed gas is led through the bed or zone of catalyst thereby providing a second synthesis gas which is the product synthesis gas. The catalyst is housed within the shell of the post converter and outside the conduit, viz. between the conduit and the shell.

The catalyst is provided as a bed or zone of catalyst material. As an alternative configuration, the catalyst is housed within the shell of the post converter and outside several conduits, viz. between a multitude of conduits and the shell. The multitude of conduits serves as several feeding points of $CO_2$. The catalyst is provided as a bed or zone of catalyst material. As another alternative configuration, the catalyst is housed within one or more tubes of the post converter whilst the $CO_2$ rich gas is led along such catalyst filled tubes and in heat exchange relationship with such catalyst filled tubes.

The post converter is indirectly heated by the heat from the synthesis gas in that the $CO_2$ rich gas stream is heated by heat exchange with the product synthesis gas prior to entering the mixing zone. Thereby, the energy consumption of the overall process is reduced compared to producing a similar synthesis gas directly from a fired reformer, as example. Moreover, the addition of a $CO_2$ rich gas into the mixing zone assists in suppression of the Boudouard reaction, viz. the reaction $2CO \rightarrow CO_2 + C$. Hereby, the use of heat exchange by means of a synthesis gas over the catalyst is rendered possible without overly increasing the risk that the temperature decrease of the gas in the mixing zone increases the risk of carbon formation over the downstream catalyst. Finally, since a heat exchange relationship is incorporated within the post converter, the need for an individual or separate heat exchanger is reduced or even removed. This makes the configuration suitable for revamping an already existing synthesis gas plant.

The term "pipe" is meant to denote any appropriate channel, duct, tube or other means for routing a hot gas from one reactor to another. The term "the mixing zone is upstream the catalyst of the reverse reforming reactor" is meant to denote that the mixing zone is upstream the catalyst as seen from flow direction of the $CO_2$ rich gas stream and/or as seen from the flow direction of the mixed gas. The term "post converter" is meant to denote a reactor downstream a synthesis gas generation reactor, such as a steam methane reformer, where the steam reforming, methanation and reverse water gas shift reaction run towards equilibrium in the post converter. The synthesis gas from the synthesis gas generation reactor is converted into a product synthesis gas in the post converter, the product synthesis gas having a lower $H_2/CO$ ratio than the synthesis gas from the synthesis gas generation reactor.

In an embodiment the synthesis gas generation reactor is a steam methane reforming reactor. The combination of steam methane reforming reactor producing a first synthesis gas in a parallel arrangement with a post converter having a conduit for supplying a $CO_2$ rich gas stream in heat exchange relationship with the catalyst within the post converter renders it possible to change the product synthesis gas composition to a gas which would have be considered critical with respect to carbon formation in a typical steam methane reformer configuration, without being critical in the concept of the invention. Thus, the $H_2/CO$ ratio of the resulting synthesis gas may be lower than the $H_2/CO$ ratio possible with only a steam reformer.

In another embodiment, the synthesis gas generation reactor is an autothermal reactor (ATR reactor). The combination of an ATR reactor producing a first synthesis gas in a parallel arrangement with a post converter having a conduit for supplying a $CO_2$ rich gas stream in heat exchange relationship with the catalyst within the post converter renders it possible to increase the amount of carbon monoxide produced per unit of oxygen consumed and also renders it possible to decrease the size of the ATR reactor per unit of carbon monoxide produced compared to what is possible with an ATR reactor.

According to the invention, the $CO_2$ rich gas stream is heated by heat exchange with the product synthesis gas from the catalyst of the post converter, the gas flowing over the catalyst, and/or the mixed gas, ultimately resulting in a cooling of the product synthesis gas of the post converter, compared to a case without the conduit arranged for supplying the $CO_2$ rich gas stream into the mixing zone. Hence, at least part of the heating duty needed to heat the $CO_2$ rich gas stream to the temperature obtained immediately upstream the mixing zone comes indirectly by cooling of the first synthesis gas. Thus, this heating duty required for heating of the $CO_2$ rich gas stream does not need to be supplied by for example combustion of natural gas. Thereby, the overall efficiency of the process is increased compared to other more conventional processes where heating duty is supplied by combustion. Furthermore, the gas flowing through the catalyst has a lower thermodynamic potential for metal dusting compared to the first synthesis gas produced either by an ATR reactor or an SMR due to the addition of $CO_2$.

Furthermore, the temperature of the gas flowing through the catalyst is preferably between 700° C. and 1000° C., preferably above 800° C., more preferably above 850° C. and most preferably above 900° C. At these temperatures the thermodynamic potential for metal dusting, as expressed for example by the Boudouard reaction, is low compared to the conditions in a conventional heat exchange reformer, thus reducing the risk of metal dusting of the material of catalyst used in the post converter. A relatively high temperature of the gas flowing through the catalyst is also an advantage as the methane content decreases with increasing temperature. Typically, the maximum temperature of the $CO_2$ gas entering the mixing zone will not be higher than ca. 40° C. below the temperature of the first synthesis gas leaving the synthesis gas generation reactor as a low difference will result in the need for a large heat exchange zone inside the post converter. Preferably, the maximum temperature of the $CO_2$ gas entering the mixing zone will not be higher than ca. 60° C. below the temperature of the first synthesis gas leaving the synthesis gas generation reactor.

The heat exchange between the $CO_2$ rich gas stream and the gas within the post converter preferably ensures that the temperature of the $CO_2$ rich gas stream at the mixing point is between about 500° C. and 1000° C., more preferably between 700° C. and 1000° C. and most preferably between 800° C. and 1000° C. It is an advantage that the temperature of the $CO_2$ rich gas stream is high at the mixing point, in order to ensure that the temperature of the mixed gas in the mixing zone and thus of the mixed gas in the bed or zone of catalyst is high, so that the carbon formation on the catalyst in the post converter is avoided. The temperature of the catalyst depends on the operating conditions but typically would be above 750° C., more preferably above 800° C., more preferably 850° C. and most preferably above 900° C. A typical maximum temperature for the catalyst is about 1000° C.

Thus, the present invention enables a capacity increase of a synthesis gas generation reactor, where the post converter enables more carbon monoxide production. Additionally, the system provides for synthesis gas composition adjustment, as the addition of a $CO_2$ rich gas stream enables production of $H_2/CO$ ratios lower than those $H_2/CO$ ratios typically obtainable in a single synthesis gas generation reactor.

The term "synthesis gas with a low $H_2/CO$ ratio" is meant to be synonymous to the term "CO rich synthesis gas" and is meant to denote a synthesis gas with an $H_2/CO$ ratio below 2.5, more preferably a synthesis gas with an $H_2/CO$ ratio below 2.0, more preferably a synthesis gas with an $H_2/CO$ ratio below 1.8, even more preferably a synthesis gas with an $H_2/CO$ ratio below 1.6. Moreover, the term "$CO_2$ rich gas" is meant to denote a gas stream with a $CO_2$ content of at least 50 dry mole %, such as at least 70 dry mole %, such as at least 90 dry mole %.

Within this context, the term "O/C" or "O/C ratio" is an abbreviation for the atomic oxygen-to-carbon ratio. The oxygen-to-carbon ratio is the ratio of moles of oxygen to moles of carbon in a gas. Moreover, the term H/C or "H/C ratio" is an abbreviation for the atomic hydrogen-to-carbon ratio. The hydrogen-to-carbon ratio is the ratio of moles hydrogen to moles of carbon in a gas. Furthermore, the term S/C or "S/C ratio" is an abbreviation for the steam-to-carbon ratio. The steam-to-carbon ratio is the ratio of moles of steam to moles of carbon in hydrocarbons in the gas. Thus, S/C is the total number of moles of steam divided by the total number of moles of carbon in the hydrocarbons in the gas. It should be noted that the term "C" in the ratio S/C thus is different from the "C" in the ratios H/C and O/C, since in S/C "C" is from hydrocarbons only, whilst in O/C and H/C, "C" denotes all the carbon in the gas.

The product synthesis gas output from the post converter may undergo further process steps downstream the post converter, such as separation in a separation unit. For example, $CO_2$ in the product synthesis gas may be separated off. The separation unit may e.g. be a flash separation unit, a pressure swing adsorption (PSA) unit, a temperature swing adsorption (TSA) unit, a membrane unit, $CO_2$ wash or a combination of $CO_2$ separation and a cold box. A cold box is defined as a cryogenic process for separation of a mixture of $H_2$, CO, and other gasses into a somewhat pure stream of CO, a somewhat pure stream of $H_2$, and a balancing stream of what remains from the feed stream.

By flash separation is meant a phase separation unit, where a stream is divided into a liquid and gas phase according to the thermodynamic phase equilibrium at a given temperature.

By CO$_2$ wash is meant a unit utilizing a process, such as chemical absorption, for removing CO$_2$ from the process gas. In chemical absorption, the CO$_2$ containing gas is passed over a solvent which reacts with CO$_2$ and in this way binds it. The majority of the chemical solvents are amines, classified as primary amines as monoethanolamine (MEA) and digylcolamine (DGA), secondary amines as diethanolamine (DEA) and diisopropanolamine (DIPA), or tertiary amines as triethanolamine (TEA) and methyldiethanolamine (MDEA), but also ammonia and liquid alkali carbonates as K$_2$CO$_3$ and NaCO$_3$ can be used.

By swing adsorption, a unit separating heavy gases (such as CO$_2$) from lighter gases (such as H$_2$) adsorption is meant. In this type of equipment, a dynamic equilibrium between adsorption and desorption of the heavy gases over an adsorption material is established. The adsorption can be caused by steric, kinetic, or equilibrium effects. The exact mechanism will be determined by the used adsorbent and the equilibrium saturation will be dependent on temperature and pressure. Typically, the adsorbent material is treated in the process gas until near saturation and will subsequently need regeneration. The regeneration can be done by changing pressure or temperature. In practice, this means that a two reactor process is used, saturating the adsorbent at high pressure or low temperature initially in one reactor and then switching reactor, now desorbing the heavy gases from the same reactor by decreasing the pressure or increasing the temperature.

By membrane is meant separation over an at least partly solid barrier, such as a polymer, where the transport of individual gas species takes place at different rates defined by their permeability. This allows for up-concentration, or dilution, of a component in the retentate of the membrane.

By cryogenic separation is meant a process utilizing the phase change of different species in the gas to separate individual components from a gas mixture by controlling the temperature.

The synthesis gas generation reactor comprises a first inlet for feeding the hydrocarbon feed stream, possibly together with carbon dioxide and steam into the synthesis gas generation reactor and possibly with a separate inlet for inletting an oxygen containing stream, and an outlet for outletting the first synthesis gas. The system may comprise means for allowing at least a part of the first synthesis to bypass the post converter. Such a bypassed part of the first synthesis gas may later be combined with the product synthesis gas from the post converter thereby providing a second product synthesis gas.

The term "hydrocarbon feed stream" is meant to denote a feed stream comprising a hydrocarbon gas with one or more hydrocarbons, and possibly other constituents, such as CO$_2$ and/or steam. Examples of "a hydrocarbon gas" may be natural gas, town gas, methane or a mixture of methane and higher hydrocarbons. Typically, the hydrocarbon feed stream is a hydrocarbon gas stream comprising minor amounts of hydrogen, carbon monoxide, carbon dioxide, nitrogen, or argon or combinations thereof, in addition to the steam and possibly carbon dioxide added to the hydrocarbon gas.

For reforming processes, an example of a "hydrocarbon gas stream and steam" is e.g. a mixture of methane, steam, and possibly other oxidizing gasses, such as carbon dioxide. Another example of a hydrocarbon gas stream and steam is a desulfurized and preformed stream of natural gas and steam.

The term "hydrocarbon feed stream" is meant to denote a gas stream comprising a hydrocarbon gas stream and possibly also steam, carbon dioxide or other gasses.

Typically, the hydrocarbon feed stream will have undergone desulfurization to remove any sulfur in the feed and thereby avoid deactivation of the catalysts in the process.

Optionally, the hydrocarbon feed stream will also have undergone adiabatic performing according to reaction (iv) in a temperature range of ca. 350-550° C. to convert higher hydrocarbons as an initial step in the process. Adiabatic performing normally takes place downstream the desulfurization step. The performing removes the risk of carbon formation from higher hydrocarbons on catalyst in the subsequent process steps. An example of a hydrocarbon feed stream is a desulfurized and preformed stream of natural gas and steam.

It should be understood that the term "an inlet" and "an outlet" is not intended to be limiting. Thus, these terms also cover the possibility where the units, e.g. the synthesis gas generation reactor, have more than one inlet and/or outlet.

In other embodiments, the synthesis gas generation reactor of the system a thermal partial oxidation reactor or a catalytic partial oxidation reactor.

In a TPOX reactor the hydrocarbon feed stream and the oxidant react thermally without catalyst in a refractory lined reactor at high temperature. The temperature of the synthesis gas leaving the TPOX will often be above 1200-1300° C. or even above. No catalyst is involved. Little or no steam or carbon dioxide is added to the hydrocarbon feed stream as this may promote the formation of soot. The autothermal reforming reactor and the thermal partial oxidation reactor are in particular advantageous as the synthesis gas generation reactor due to the high temperature obtainable for the first synthesis gas exiting the reactor.

The invention is thus useful when the gas heated post converter is combined with either an SMR, an ATR reactor, a thermal partial oxidation reactor or a catalytic partial oxidation reactor. The invention is also useful in the case in which the synthesis gas generation reactor comprises an SMR placed upstream and in series with an ATR reactor.

In an embodiment, the conduit comprises a first part arranged for conducting the CO$_2$ rich gas stream in heat exchange relationship with the product synthesis gas. Hereby, the CO$_2$ rich gas stream is heated by heat exchange both along the part of the post converter housing the catalyst and along the first part of the conduit. The first part of the conduit is upstream the part of the conduit where the gas within the conduit is in heat exchange relationship with the gas flowing over the catalyst, as seen from the flow direction of the CO$_2$ rich gas stream.

In an embodiment, the conduit comprises a second part arranged for conducting the CO$_2$ rich gas stream in heat exchange relationship with the mixed gas in the mixing zone. Hereby, the CO$_2$ rich gas stream is heated by heat exchange both along the part of the post converter housing the catalyst and along the second part of the conduit. The second part of the conduit is downstream the part of the conduit where the gas within the conduit is in heat exchange relationship with the gas flowing over the catalyst, as seen from the flow direction of the CO$_2$ rich gas stream.

In an embodiment, the CO$_2$ rich gas stream is heated in a fired heater, in an electrically heated heater, by heat exchange with at least part of the product synthesis gas exiting the post converter, and/or by heat exchange with superheated steam prior to being inlet into the post converter. The temperature of the CO$_2$ rich gas stream prior to being inlet to the post converter is e.g. between 200° C. and 600° C., more preferably between 300° C. and 500° C. When the $CO_2$ rich gas stream is heated prior to being inlet into the post converter, the Boudouard reaction is suppressed. Thereby, the risk of metal dusting is decreased is decreased.

In an embodiment, the catalyst is a steam reforming catalyst. Steam reforming catalyst is also denoted steam methane reforming catalyst or methane reforming catalyst. Examples of steam reforming catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier, but other catalysts suitable for reforming are also conceivable. The steam reforming catalyst is arranged to catalyze the steam methane reforming reaction; however, since the gas inlet to the post converter is a synthesis gas stream comprising hydrogen and carbon monoxide, steam methane reforming, methanation and reverse water gas shift reactions all take place in the post converter and the overall content of methane, steam and carbon monoxide outlet from the post converter is increased.

Another aspect of the invention relates to a process for production of a synthesis gas, comprising:

- in a synthesis gas generation reactor producing a first synthesis gas from a hydrocarbon feed stream;
- supplying a $CO_2$ rich gas stream into a mixing zone of the post converter via a conduit, where the $CO_2$ rich gas stream in the conduit upstream the mixing zone is in heat exchange relationship with gas flowing over the catalyst prior to mixing the $CO_2$ rich gas stream with the at least part of the first synthesis gas in the mixing zone,
- supplying at least a part of the first synthesis gas from the synthesis gas generation reactor into a mixing zone of a post converter via a pipe, thereby combining the at least part of the first synthesis gas and the $CO_2$ rich gas stream to a mixed gas, where the post converter comprises a shell housing a catalyst, the catalyst being active for catalyzing steam methane reforming, methanation and reverse water gas shift reactions, and where the mixing zone is upstream the catalyst,
- producing a product synthesis gas from the mixed gas by carrying out steam methane reforming, methanation and reverse water gas shift reactions over the catalyst; and
- outletting the product synthesis gas from the post converter.

The process and embodiments thereof provide similar advantages as described in relation to the system of the invention. These will therefore not be described in further detail here.

BRIEF DESCRIPTION OF THE DRAWING

An embodiment of the present invention is explained, by way of example, and with reference to the accompanying drawing. It is to be noted that the appended drawing illustrates only an example of an embodiment of this invention and is therefore not to be considered limiting of its scope, for the invention may admit to other equally effective embodiments.

FIG. 1 is a schematic drawing of an embodiment of the system for production of synthesis gas according to the invention.

DETAILED DESCRIPTION

FIG. 1 shows a system 100 for production of a product synthesis gas 12. The system 100 comprises a synthesis gas generation reactor 10 arranged for producing a first synthesis gas 5 from a hydrocarbon feed stream 3. In the embodiment of FIG. 1, the synthesis gas generation reactor 10 is an autothermal reforming (ATR) reactor.

A hydrocarbon feed stream 3 to the ATR reactor 10 is made up of a stream of hydrocarbon gas 1, such as natural gas, which is combined with a stream 2 of steam and possibly $CO_2$. The combination of the hydrocarbon gas 1 and the stream 2 of steam and possibly $CO_2$ is the hydrocarbon feed stream 3 let into the ATR reactor 10.

An oxygen containing stream 4, such as air, a stream of steam and oxygen, an oxygen rich stream or substantially pure oxygen, is inlet into the ATR reactor 10 via an inlet. In the ATR reactor 10, partial combustion of the hydrocarbon feed stream 3 by sub-stoichiometric amounts of oxygen in the oxygen containing stream 4 is followed by steam reforming of the partially combusted feedstock in a fixed bed 11 of steam reforming catalyst, thereby producing the first synthesis gas 5 comprising hydrogen, carbon monoxide, and carbon dioxide. The first synthesis gas 5 exiting the ATR reactor 10 typically has a temperature of between about 900° C. and about 1100° C., such as about 1000° C.

The system 100 moreover comprises a post converter 20 comprising a shell 22 housing a bed of catalyst 21.

The system 100 comprises a pipe (not shown in FIG. 1) for supplying at least a part of the first synthesis gas 5 from the synthesis gas generation reactor into a mixing zone 20c of the post converter 20. The post converter 20 also has a conduit 23 for supplying a $CO_2$ rich gas stream 6 into the mixing zone 20c of the post converter 20, so that the $CO_2$ rich gas stream in the conduit upstream the mixing zone 20c is in heat exchange relationship with gas flowing over the catalyst 21, viz. downstream the mixing zone, prior to being mixed with the at least part of the first synthesis gas 5 in the mixing zone 20c. In the embodiment shown in FIG. 1, the catalyst 21 is housed within shell of the post converter 20 and outside the conduit 23, i.e. between the shell 22 and the conduit 23.

The post converter 20 comprises three zones or parts: a mixing zone 20c, a catalyst zone 20b and a product gas zone 20a. Correspondingly, the conduit 23 has three parts: a first part where the $CO_2$ rich gas stream 6 is conducted within the conduit 23 in heat exchange relationship with product synthesis gas in the product gas zone 20a; a second part where the $CO_2$ rich gas stream 6 is conducted within the conduit 23 in heat exchange relationship with gas in the catalyst zone 20b; and a third part where the $CO_2$ rich gas stream 6 is conducted within the conduit 23 in heat exchange relationship with mixed gas in the mixing zone 20c. The extent of the mixing zone 20c and/or the product gas zone 20a along the longitudinal axis (not shown in FIG. 1) may be relatively small, e.g. in a case where the catalyst zone 20b is relatively large.

The post converter 20 also comprises an outlet for outletting a product synthesis gas 12 from the post converter 20.

In the system 100, the first synthesis gas 5 is used as the source of heat in the post converter 20. However, the $CO_2$ rich gas stream 6 may be preheated prior to being let into the post converter 20 via the conduit 23.

The catalyst 21 carries out steam methane reforming, methanation and reverse water gas shift reactions of the mixed gas, thereby providing a product synthesis gas 12. Downstream the catalyst zone 20b, the product synthesis gas undergoes heat exchanges with the $CO_2$ rich gas stream 6 within the first part of the conduit 23.

The arrows 25 indicate the direction of the flow of the $CO_2$ rich gas stream 6 from within the conduit 23. Within the mixing zone 20c, the first synthesis gas 5 and $CO_2$ rich gas stream 6 are mixed to a mixed synthesis gas.

Example

An example calculation of the process is given in Table 1 below. A hydrocarbon feed stream comprising a hydrocarbon gas, $CO_2$ and steam and having a S/C ratio of 0.6 is fed to the ATR reactor 10 of the invention as shown in FIG. 1. The hydrocarbon feed stream is heated to 650° C. prior to being let into the ATR reactor 10. An oxygen rich stream 4 is added and the amount is adjusted such that the temperature of the first synthesis gas 5 is 1050° C. The ATR reactor 10 produces a first synthesis gas 5.

The total flow of all components in all inlet streams to the ATR reactor and the flow of all components in the first synthesis gas 5 are given in the column headed "ATR 10" in Table 1.

A $CO_2$ rich gas stream let into the conduit and is heated in the conduit to a temperature of 988° C. by heat exchange with the gas flowing between the conduit and the shell, within the mixing zone 20c, the catalyst zone 20b and the product gas zone 20a. The $CO_2$ rich gas stream is mixed with the first synthesis gas to form a mixed synthesis gas, having a temperature of 1038° C.

Within the catalyst zone 20b of the post converter 20 the combined stream is equilibrated, viz. it undergoes reverse water gas shift, methanation and reforming reactions to equilibrium. The exit temperature of the product synthesis gas 12 exiting the post converter 20 is around 995° C., which is well below the methane decomposition equilibrium temperature for the gas of 1349° C. and above the Boudouard temperature for the gas of 860° C. Consequently, the product synthesis gas 12 does not have potential for carbon formation.

Thus, when the system and process are used, it is possible to provide a product synthesis gas having a relative high amount of CO. In the example of Table 1, the $H_2$/CO ratio is 1.0, while the H/C and O/C ratios are 2.5 and 1.9, respectively.

In this context, the methane decomposition temperature (T(MDC)) is calculated as the temperature where the equilibrium constant of the methane decomposition into graphite ($CH_4 \leftrightarrow C+2H_2$) equals the reaction quotient (QC) of the gas. Formation of graphitic carbon can take place when the temperature is higher than this temperature.

The reaction quotient QC is defined as the ratio of the square of the partial pressure of hydrogen to the partial pressure of methane, i.e. $QC=P^2_{H2}/P_{CH4}$.

The Boudouard equilibrium temperature (T(BOU)) is calculated in a similar way, but from the Boudouard reaction ($2CO \leftrightarrow C+CO_2$) and in this case formation of graphitic carbon can take place when the temperature is lower than this Boudouard equilibrium temperature.

A comparative example of the corresponding numbers for producing a similar synthesis gas in system with an ATR reactor but without an adiabatic post converter, here denoted "a stand alone ATR reactor", is shown in Table 2. In this case, all $CO_2$ is added up-front the ATR reactor which operates at a S/C of 0.6. Comparing the examples shows that more oxygen is needed in the standalone ATR reactor.

TABLE 1

|  | ATR 10 | $CO_2$ 6 | Catalyst bed of Post converter 20 | Exit of Post converter 20 |
|---|---|---|---|---|
| Inlet T [° C.] | 650 | 180 | 1038 |  |
| Outlet T [° C.] | 1050 | 988 | 995 | 853 |
| Inlet P [kg/cm²g] | 35.5 | 35.5 | 34.5 | 34 |
| Outlet P [kg/cm²g] | 34.5 | 34.5 | 34 | 33.5 |
| Outlet T(MDC) [° C.] | — | — | 1349 |  |
| Outlet T(BOU) [° C.] | 891 | — | 860 |  |
| Inlet: |  |  |  |  |
| $N_2$ [Nm³/h] | 26 |  | 245 |  |
| $CO_2$ [Nm³/h] | 8487 | 11615 | 17583 |  |
| $CH_4$ [Nm³/h] | 18695 |  | 373 |  |
| $H_2$ [Nm³/h] | 394 |  | 31372 |  |
| $H_2O$ [Nm³/h] | 11321 |  | 16988 |  |
| CO [Nm³/h] | 0 |  | 20842 |  |
| Oxygen inlet: |  |  |  |  |
| $O_2$ [Nm³/h] | 10735 |  |  |  |
| $N_2$ [Nm³/h] | 219 |  |  |  |
| Oxygen feed T [° C.] | 371 |  |  |  |
| Outlet: |  |  |  |  |
| $N_2$ [Nm³/h] | 245 |  | 245 | 245 |
| $CO_2$ [Nm³/h] | 5968 | 11615 | 12720 | 12720 |
| $CH_4$ [Nm³/h] | 373 |  | 392 | 392 |
| $H_2$ [Nm³/h] | 31372 |  | 26451 | 26451 |
| $H_2O$ [Nm³/h] | 16988 |  | 21870 | 21870 |
| CO [Nm³/h] | 20842 |  | 25685 | 25685 |
| Total outlet flow [Nm³/h] | 75788 |  |  |  |

TABLE 2

|  | Stand alone ATR |
|---|---|
| Inlet T [° C.] | 650 |
| Outlet T [° C.] | 1050 |
| Inlet P [kg/cm²g] | 35.5 |
| Outlet P [kg/cm²g] | 34.5 |
| Outlet T (MDC) [° C.] | — |
| Inlet: |  |
| $N_2$ [Nm³/h] | 26 |
| $CO_2$ [Nm³/h] | 18678 |
| $CH_4$ [Nm³/h] | 18967 |
| $H_2$ [Nm³/h] | 400 |
| $H_2O$ [Nm³/h] | 11494 |
| CO [Nm³/h] | 0 |
| Oxygen feed: |  |
| $O_2$ [Nm³/h] | 11739 |
| $N_2$ [Nm³/h] | 240 |
| Oxygen feed T [° C.] | 371 |
| Outlet: |  |
| $N_2$ [Nm³/h] | 266 |
| $CO_2$ [Nm³/h] | 11807 |
| $CH_4$ [Nm³/h] | 153 |
| $H_2$ [Nm³/h] | 26493 |
| $H_2O$ [Nm³/h] | 23029 |
| CO [Nm³/h] | 25685 |
| Total outlet flow [Nm³/h] | 87433 |

From Table 1 and Table 2, it is seen that the outlet flow from the ATR reactor in the case of the present invention is smaller than with a stand-alone ATR. This means that a smaller ATR can be designed by using the concepts of the invention. This also means that in case of revamps, the production of carbon monoxide can be boosted without the need for enlarging a given ATR reactor. This is done by adding the post converter to form a system and to operate a process according to the invention.

The oxygen consumption (calculated as $O_2$ consumed/CO produced [Nm³/Nm³]) is 0.418 versus 0.457 for the standalone ATR. Hence, oxygen is saved according to the invention which reduces the capital cost of the air separation unit for producing oxygen.

The invention claimed is:

1. A system for production of a synthesis gas, comprising:
a synthesis gas generation reactor arranged for producing a first synthesis gas from a hydrocarbon feed stream; and
a post converter comprising a shell housing a catalyst, said catalyst being active for catalyzing steam methane reforming, methanation and reverse water gas shift reactions; said post converter comprising a conduit for supplying a $CO_2$ rich gas stream into a mixing zone of said post converter, said mixing zone being upstream said catalyst, where said $CO_2$ rich gas stream in said conduit upstream said mixing zone is in heat exchange relationship with gas flowing over said catalyst downstream the mixing zone;
where said system further comprises a pipe for supplying at least a part of said first synthesis gas from said synthesis gas generation reactor into said mixing zone of said post converter, thereby combining said at least part of the first synthesis gas and said $CO_2$ rich gas stream to a mixed gas,
wherein said post converter further comprises an outlet for outletting a product synthesis gas from said post converter.

2. A system according to claim 1, wherein said synthesis gas generation reactor is an autothermal reforming reactor, a thermal partial oxidation reactor, a catalytic partial oxidation reactor or a steam methane reforming reactor.

3. A system according to claim 1, wherein said conduit comprises a first part arranged for conducting said $CO_2$ rich gas stream in heat exchange relationship with said product synthesis gas.

4. A system according to claim 1, wherein said conduit comprises a second part arranged for conducting said $CO_2$ rich gas stream in heat exchange relationship with the mixed gas in said mixing zone.

5. A system according to claim 1, wherein said $CO_2$ rich gas stream is heated in a fired heater, in an electrically heated heater, by heat exchange with at least part of the product synthesis gas exiting the post converter, and/or by heat exchange with superheated steam prior to being inlet into the post converter.

6. A system according to claim 1, wherein the catalyst is a steam reforming catalyst.

7. A process for production of a synthesis gas, comprising:
in a synthesis gas generation reactor producing a first synthesis gas from a hydrocarbon feed stream;
supplying a $CO_2$ rich gas stream into a mixing zone of a post converter via a conduit, where said post converter comprises a shell housing a catalyst, where said $CO_2$ rich gas stream in said conduit upstream said mixing zone is in heat exchange relationship with gas flowing over catalyst prior to mixing said $CO_2$ rich gas stream with at least part of the first synthesis gas in said mixing zone,
supplying said at least a part of the first synthesis gas from said synthesis gas generation reactor into a mixing zone of said post converter via a pipe, thereby combining said at least part of the first synthesis gas and said $CO_2$ rich gas stream to a mixed gas, where said post converter, said catalyst being active for catalyzing steam methane reforming, methanation and reverse water gas shift reactions, and where said mixing zone is upstream said catalyst,
producing a product synthesis gas from said mixed gas by carrying out steam methane reforming, methanation and reverse water gas shift reactions over said catalyst, and
outletting said product synthesis gas from said post converter.

8. A process according to claim 7, wherein said synthesis gas generation reactor is an autothermal reforming reactor, a partial oxidation reactor, a catalytic partial oxidation reactor or a steam methane reforming reactor.

9. A process according to claim 7, wherein said $CO_2$ rich gas stream is conducted in heat exchange relationship with said product synthesis gas upstream said catalyst.

10. A process according to claim 7, wherein said $CO_2$ rich gas stream is conducted in heat exchange relationship with the mixed gas in said mixing zone downstream said catalyst.

11. A process according to claim 7, wherein said $CO_2$ rich gas stream is heated in a fired heater, in an electrically heated heater, by heat exchange with at least part of the product synthesis gas exiting the post converter, and/or by heat exchange with superheated steam prior to being inlet into the post converter.

12. A process according to claim 7, wherein the catalyst is a steam reforming catalyst.

* * * * *